United States Patent
Bar-Cohen

(10) Patent No.: US 12,240,639 B2
(45) Date of Patent: *Mar. 4, 2025

(54) MOBILE AUTOMATED MODULAR PRODUCT PACKING SYSTEM AND METHOD

(71) Applicant: Sojo Industries, Bristol, PA (US)

(72) Inventor: Barak Bar-Cohen, Princeton, NJ (US)

(73) Assignee: Sojo Industries, Inc., Bristol, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/820,894

(22) Filed: Aug. 30, 2024

(65) Prior Publication Data
US 2024/0417120 A1  Dec. 19, 2024

Related U.S. Application Data

(63) Continuation of application No. 17/719,270, filed on Apr. 12, 2022, now Pat. No. 12,116,155.

(60) Provisional application No. 63/173,746, filed on Apr. 12, 2021.

(51) Int. Cl.
*B65B 35/50* (2006.01)
*B65B 57/14* (2006.01)
*F16M 3/00* (2006.01)

(52) U.S. Cl.
CPC .............. *B65B 35/50* (2013.01); *B65B 57/14* (2013.01); *F16M 3/00* (2013.01)

(58) Field of Classification Search
CPC ............ B65B 65/50; B65B 57/14; F16M 3/00
USPC ................ 108/51.11, 54.1, 55.1, 55.3, 55.5
See application file for complete search history.

(56) References Cited

U.S. PATENT DOCUMENTS

| | | |
|---|---|---|
| 1,745,046 A | 1/1930 | Romine |
| 3,176,632 A | 4/1965 | Yingling |
| 3,650,224 A | 3/1972 | Petix et al. |
| 4,095,769 A | 6/1978 | Fengels |
| 4,694,962 A | 9/1987 | Taub |
| 4,741,442 A | 5/1988 | Slocumb |
| 5,016,761 A | 5/1991 | Stoddard et al. |
| 5,105,746 A | 4/1992 | Reynolds |
| 5,267,516 A | 12/1993 | Abrahamson et al. |
| 5,388,532 A | 2/1995 | Wakano |
| 5,727,365 A | 3/1998 | Lashyro et al. |
| 5,771,658 A | 6/1998 | Olson et al. |
| 5,772,369 A | 6/1998 | Lerman et al. |
| 5,787,680 A | 8/1998 | Tisma et al. |
| 6,263,807 B1 | 7/2001 | Fox et al. |
| 6,742,459 B2 | 6/2004 | Lucas |
| 6,836,692 B2 | 12/2004 | Leavitt et al. |
| 7,762,198 B2 | 7/2010 | Rasmusson et al. |

(Continued)

FOREIGN PATENT DOCUMENTS

| | | | |
|---|---|---|---|
| CN | 117320978 A | 12/2023 | |
| DE | 202019005396 U1 | * 8/2020 | ............. B65B 35/36 |

*Primary Examiner* — Jose V Chen
(74) *Attorney, Agent, or Firm* — Banner & Witcoff, Ltd.

(57) ABSTRACT

Product packing systems and methods are provided. A product packing system may include multiple product packing production sections and multiple modular frame sections. Each modular frame section may support one of the product packing production sections and be configured to connect to an adjacent modular frame section. An assembled product packing system may be transported to an installation location and moved to an installation site at the installation location.

24 Claims, 8 Drawing Sheets

(56) References Cited

U.S. PATENT DOCUMENTS

| | | |
|---|---|---|
| 7,802,527 B2 | 9/2010 | Dong |
| 7,891,675 B2 | 2/2011 | Dobra et al. |
| 7,909,074 B2 | 3/2011 | Yu |
| 8,701,570 B2 | 4/2014 | Wilson et al. |
| 8,931,420 B2 | 1/2015 | Larson et al. |
| 9,422,083 B1 | 8/2016 | Embleton et al. |
| 10,696,494 B1 | 6/2020 | Diankov et al. |
| 2005/0274091 A1 | 12/2005 | Bridier et al. |
| 2008/0228316 A1 | 9/2008 | Stevens et al. |
| 2010/0288169 A1 | 11/2010 | Du Toit |
| 2011/0232059 A1 | 9/2011 | Rossmann et al. |
| 2014/0102338 A1 | 4/2014 | Stevens |
| 2015/0000570 A1 | 1/2015 | Day et al. |
| 2015/0151873 A1 | 6/2015 | Luis y Prado |
| 2015/0158611 A1 | 6/2015 | Kalany et al. |
| 2016/0039568 A1 | 2/2016 | Huber |
| 2016/0096274 A1 | 4/2016 | Baylor et al. |
| 2016/0114936 A1 | 4/2016 | Muirhead |
| 2018/0022491 A1 | 1/2018 | Hogue et al. |
| 2021/0094716 A1 | 4/2021 | Showman et al. |
| 2021/0147102 A1 | 5/2021 | Dittrich et al. |
| 2022/0177231 A1 | 6/2022 | Kopecko |
| 2023/0294856 A1 | 9/2023 | Iwasa et al. |
| 2023/0322438 A1 | 10/2023 | Kremer |

\* cited by examiner

MOBILE AUTOMATED MODULAR PRODUCT PACKING SYSTEM AND METHOD

CROSS-REFERENCE TO RELATED APPLICATIONS

This application is a continuation of U.S. patent application Ser. No. 17/719,270 titled "Mobile Automated Modular Variety and Multi Pack Production Line System and Method" filed on Apr. 12, 2022, and this application claims priority to U.S. Provisional Patent Application No. 63/173,746, filed on Apr. 12, 2021, each of which is incorporated herein by reference herein in its entirety.

BACKGROUND

Over the past decade, customer demand for variety and multi-pack offerings from club stores, superstores and other retail outlets has increased exponentially and along with it, the demand for bulk food and beverage packages which are varied and discounted. A variety pack will typically take the form of an assortment of individually packaged foods or beverage items provided by a common manufacturer and packaged into a single pack. With the increase in demand, food and beverage companies have been forced to adapt their demand planning to accommodate the complexities of managing the variety pack business. Current challenges include the following key elements:

Shortage of Popular SKUs: Variety packs must include the top selling flavors—stock-keeping units, or SKUs—to drive demand as well as introduce customers to less popular flavors. Businesses are very often faced with shortages associated with over-heated demand for their most popular flavors which must now be sold as single cases as well as in an assortment of variety packs.

Multiple Freight Destinations: Product must be transported, often from multiple locations, to a single assembly location and then transported back to a warehouse center from which it is then distributed. The need for additional transportation can dramatically increase the freight cost per variety pack.

Wasted Packaging: A production line will typically produce a single SKU at a time, usually twenty four (24) units per case but can be any amount of units per case. In order to stack these cases on a pallet for transport, or palletize, the 12-pack groupings must be placed on a corrugate tray or on a pad and then placed in a shrink-wrapping machine. This is done in order ensure that product is not damaged or dumped during transport. Once the product is ready for placement in the new variety pack case, the corrugate tray and shrink wrap is discarded and becomes a complete waste. This process adds significant costs.

Unreliable Labor: Most beverage brands do not have the scale and national production capabilities to introduce efficient scalable variety packing solutions. As such, most of the variety packing industry relies on manual labor which is building the variety packs by hand in a human assembly line. Not only is the variety packing work very difficult, monotonous and prone to human error, but it has become very difficult to find and manage the people necessary to do this work. The variety packing industry is plagued with a lack of labor, frequent no-shows, high attrition rates, and an assortment of disciplinary issues consistent with managing large pools of unskilled labor.

Erratic Planning and Inventory Management: Variety packs can create SKU inflation where several different types of packages are introduced simultaneously—30 packs, 24 packs, 18 packs, 12 packs, 6 packs, and 4 packs are typical variety and multi-pack types. It becomes very difficult to keep track of this demand as well as manage the production schedule to support the ongoing sales of popular SKUs. As a result, ingredient shortages, online out of stock notices, and the elimination of expired product are common occurrences that result in significant costs.

Few Scalable Options: Due to the complexity of the variety packaging process and the lack of scale for a majority of the beverage brands, there are few scalable providers of variety packaging services. Those who do offer these services do so at a high cost per pack and often rely on unreliable manual labor which requires long lead times and results in frequent disruptions.

In a typical scenario, the eco-system for producing a variety or multi pack involves at least the following steps:
  Step 1: Production of a Single SKU on the Co-Packer Manufacturing Line.
  Step 2: Transport of Single SKU to a 3rd Party Logistics (3PL) Center.
  Step 3: Transport of Single SKUs from 3PL to Offsite Variety Packing Facility.
  Step 4: Transport of Variety Pack Materials (boxes, shrink, tape, CHEP pallets) to Offsite Variety Packing Facility.
  Step 5: Manual Assembly of Variety Packs and Storage at Offsite Variety Packing Facility.
  Step 6: Transport from Offsite Variety Packing Facility back to the 3PL Facility.
  Step 7: Transport from the 3PL Facility to the Distributor Facility.
  Step 8: Transport from the Distributor Facility to Retail and Online Channels.

Thus, the industry would benefit from a system and method that can eliminate steps in the conventional process, provide flexible and mobile access to variety pack production in unconventional settings, all while improving efficiency, accuracy, packaging waste, freight costs, and carbon emissions.

SUMMARY

In one embodiment, a variety pack production system includes multiple frame sections each comprising a rigid frame, multiple casters, multiple leveling legs, and multiple forklift channels; wherein each of the multiple frame sections includes multiple connection points configured to connect with at least one adjacent frame section. In one embodiment, at least at least one of the frame sections forms a non-rectangular perimeter. In one embodiment, the at least one of the frame sections is configured to connect with adjacent frame sections to form a rectangular perimeter of combined frame sections. In one embodiment, the system includes a drive system having multiple separate drive wheels configured to connect to at least one of the frame sections at separated points on the frame.

In one embodiment, a variety pack production system includes a plurality of frame sections each comprising a different component of a variety pack production line, each of the frame sections comprising a leveling system, a wire access channel, an anchoring system and a transporting structure. In one embodiment, the plurality of frame sections includes a case loading section comprising a plurality of SKU loading lanes. In one embodiment, the plurality of frame sections includes a singulation section configured to move products according to SKU. In one embodiment, the plurality of frame sections includes a variety case packer section configured to select product by SKU and place them into a variety case. In one embodiment, the plurality of frame sections includes a variety case former section configured to form variety cases. In one embodiment, the plurality of frame sections includes a robotic palletizer section having robotic equipment mounted thereto configured to palletize completed variety cases. In one embodiment, the plurality of frame sections includes a pallet loader section configured to seat loaded pallets. In one embodiment, the plurality of frame sections includes a stretch wrapper section configured to wrap loaded pallets. In one embodiment, the system includes a frame layer comprising a plurality of anchoring elements configured to interface with the anchoring system and seat a plurality of frame sections. In one embodiment, the leveling system includes multiple leveling feet connected to a bottom of each of the frame sections. In one embodiment, the anchoring system includes a protrusion having a first opening configured to align with a second opening of an adjacent frame section. In one embodiment, the transporting structure includes at least one channel below a top layer of the frame section. In one embodiment, the system includes a rechargeable battery power source. In one embodiment, the rechargeable battery power source is at least partially integrated into one of the plurality of frame sections.

In one embodiment, a method for variety pack production includes the steps of loading a first plurality of products having a common SKU into a first lane; loading a second plurality of products have a common SKU into a second lane; moving the first and second plurality of products through a singulation stage before entering a packing area; and moving a first predetermined number of the first plurality of products and a second predetermined number of the second plurality of products from the packing area into a variety pack.

BRIEF DESCRIPTION OF THE DRAWINGS

The foregoing purposes and features, as well as other purposes and features, will become apparent with reference to the description and accompanying figures below, which are included to provide an understanding of the invention and constitute a part of the specification, in which like numerals represent like elements, and in which.

DETAILED DESCRIPTION OF THE INVENTION

Figure 1A:
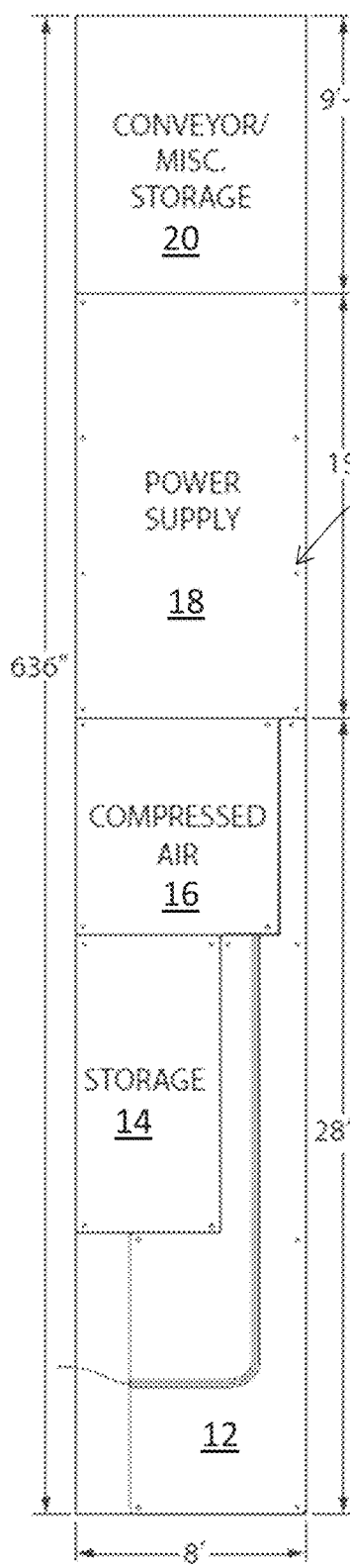
FIG. 1A is a diagram top view of a variety pack production system according to one embodiment.

It is to be understood that the figures and descriptions of the present invention have been simplified to illustrate elements that are relevant for a more clear comprehension of the present invention, while eliminating, for the purpose of clarity, many other elements found in systems and methods of variety pack production. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are described.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of +20%, +10%, +5%, +1%, and #0.1% from the specified value, as such variations are appropriate.

Ranges: throughout this disclosure, various aspects of the invention can be presented in a range format. It should be understood that the description in range format is merely for convenience and brevity and should not be construed as an inflexible limitation on the scope of the invention. Where appropriate, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Referring now in detail to the drawings, in which like reference numerals indicate like parts or elements throughout the several views, in various embodiments, presented herein is a system and method for variety pack production.

Embodiments of the system and method for variety pack production described herein implement various improvements in the art, including improvements related to the machinery (i.e. automated assembly lines that are better at packing than humans), mobility (i.e. automated assembly lines that come to the customer), and modularity (i.e. adapting to packaging input and output demands change regularly) of variety pack production lines.

Figure 1B:
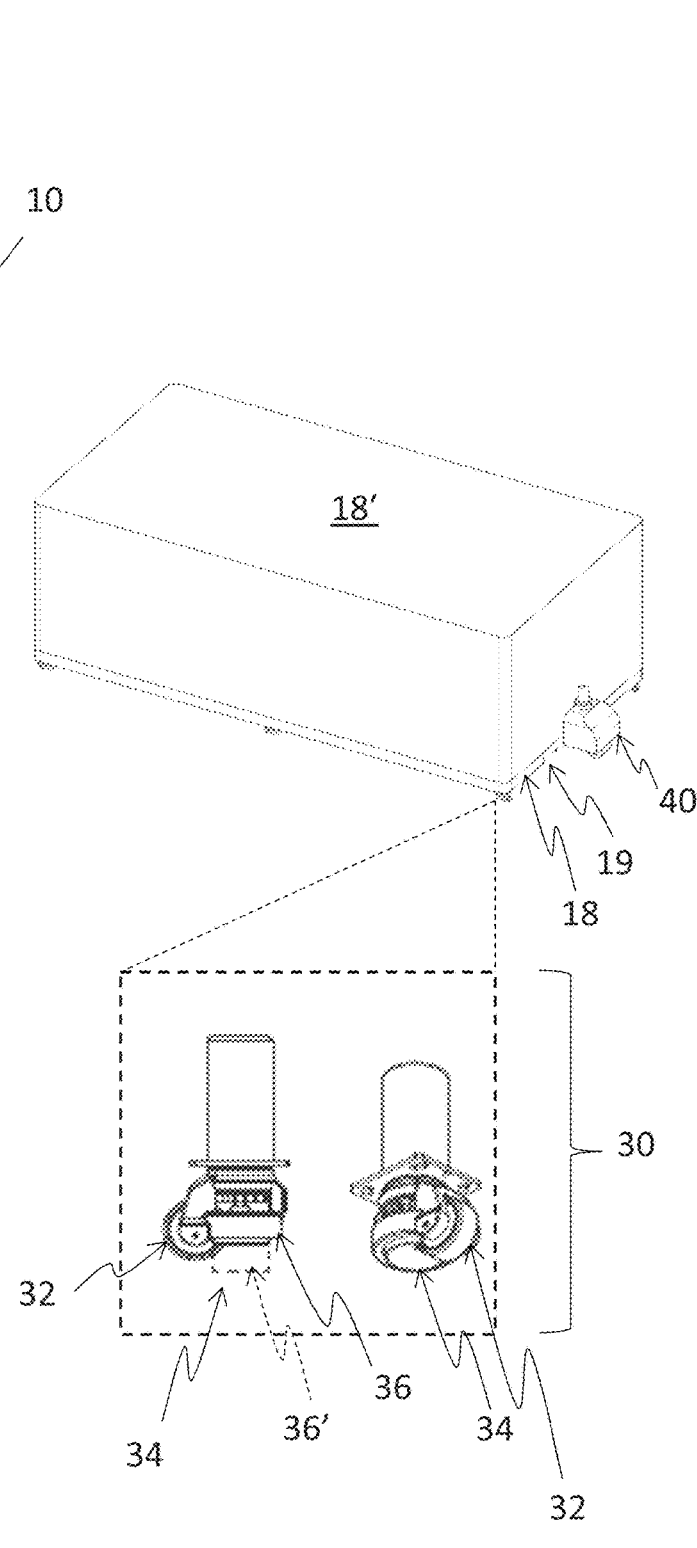
FIG. 1B is a perspective view of a frame section according to one embodiment.
Figure 2A:
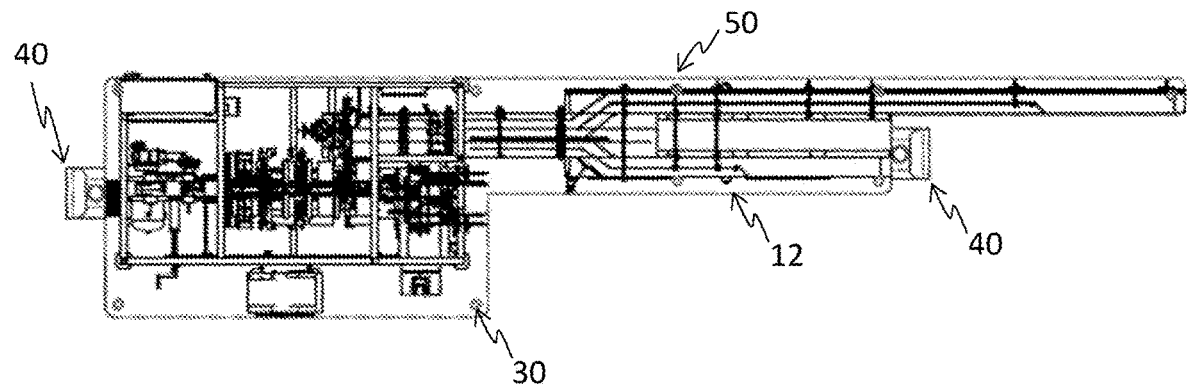
FIG. 2A is a top view of a variety pack production line sitting on a frame section according to one embodiment.
Figure 2B:
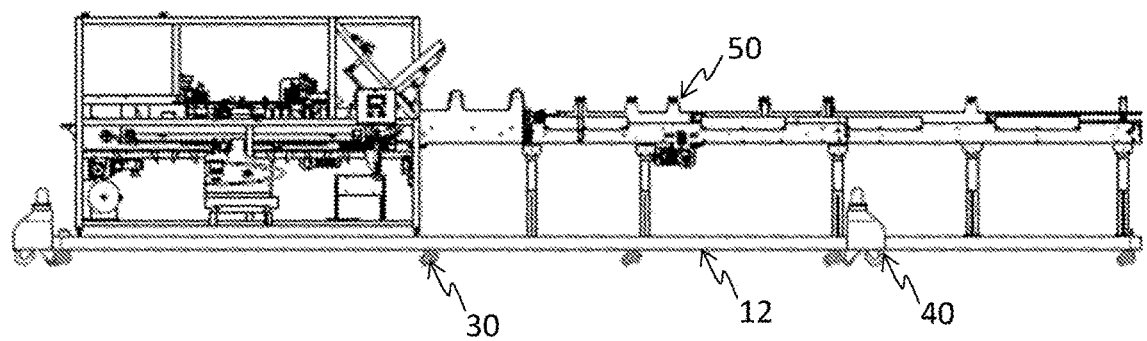
FIG. 2B is a side view of the variety pack production line sitting on a frame section.

With reference now to FIGS. 1A and 1B, a modular frame system 10 is disclosed according to one embodiment. The modular frame system 10 includes frame sections that for example include a production frame section 12, a storage frame section 14, a compressor frame section 16, a power supply frame section 18 and a conveyor or miscellaneous storage section 20. The production frame section 12 can include for example a line of production equipment that automate variety pack production. The production frame section 12 (with reference also to FIGS. 2A and 2B) can include a frame perimeter that approximates the footprint of the production equipment. In one embodiment, the frame section forms a non-rectangular perimeter (as shown in FIG. JA). Approximating the footprint of the production line equipment setup enables workers to easily access the production line without having to step onto the frame, and also allows accessory equipment (such as pallet stands, etc.) to easily position right next to the production lines without interference from the frame.

The production frame section 12, similar to other frame sections, includes a rigid frame having leg and caster sets 30 disposed about the perimeter. The leg and caster sets 30 each have a caster 32 for allowing easy movement of the frame over a surface, and a leveling foot 34 that can transition between a raised position 36 and a lowered position 36'. When the bottom of each foot 34 is in a raised position 36, each caster 32 will engage the floor, allowing users to freely maneuver that frame section. When the bottom of each foot is on a lowered position 36', the caster 32 disengages with the floor and the frame section is stabilized and stationary. The foot can be lowered or raised in finer adjustments while the caster 32 remains disengaged to adjust the frame section to a level position.

In one embodiment, the production line incorporates a consolidated electric panel. The production line requires multiple components such as air compressor, conveyors, printers, and fans in order to run in an efficient manner. In addition, the locations production locations within a facility often have power located far from that location, which results in additional complexity and cost. Accordingly, embodiments include a modified electrical panel so that it (1) feeds all of the necessary components for production and (2) provides one singular point of connection (a single "pigtail connector") with several hundred feet of wire to facilitate an easier installation and disconnect when the system arrives on-site.

In the embodiment shown in FIG. 1A, the production frame section 12 includes a storage frame section 14, which may for example include tools, supplies, and parts of the production line that are better to remain disconnected during transport. The compressed air frame section 16 can include for example a compressor that in certain embodiments includes a full or partial acoustic enclosure for sound dampening. The mobile production line requires air to power the machines which often requires expensive material and lengthy installation times by an expensive professional specialist. A commercial grade low-decibel compressor can be utilized in the operation of the line which operates on-site at third party facilities and eliminates the need to run copper piping from various parts of the facility to the mobile production line.

The power supply frame section 18 can include a portable power source, such as a battery power source. The conveyor and miscellaneous storage frame section 20 in one embodiment can include a frame that includes the conveyor apparatus and/or miscellaneous system components. In one embodiment, the conveyor/miscellaneous storage frame section 20 instead represents a void. The frame sections (as depicted in FIG. 1A) are modular and can attach together such that the entire frame system moves as a single unit on the casters for easy loading and unloading from a trailer. In one embodiment, the frame section assembles to a dimension that allows it to fit within a standard trailer, such as 53 feet or less in length, and 8 feet or less in width. Accordingly, the frame sections can be connected to easily roll into and out of a standard trailer as a single unit. The frame sections can also easily roll to different areas of a warehouse, production facility or storage facility, and specific frame sections can be easily swapped out for repair or maintenance of the equipment corresponding with that section, minimizing transport time and downtime of the system. Due to the nature of providing a mobile production line requiring frequent movement and transport, the reinforced frame for the production line according to one embodiment incorporates hydraulic piping to facilitate installation, leveling, and anchoring.

Figure 3A:
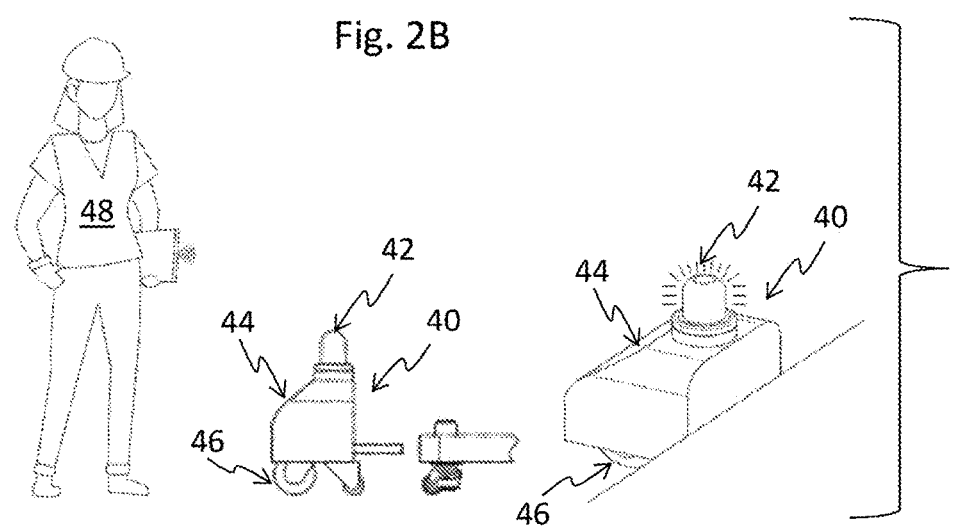
FIG. 3A is a multi-view of a drive system according to one embodiment.
Figure 3B:
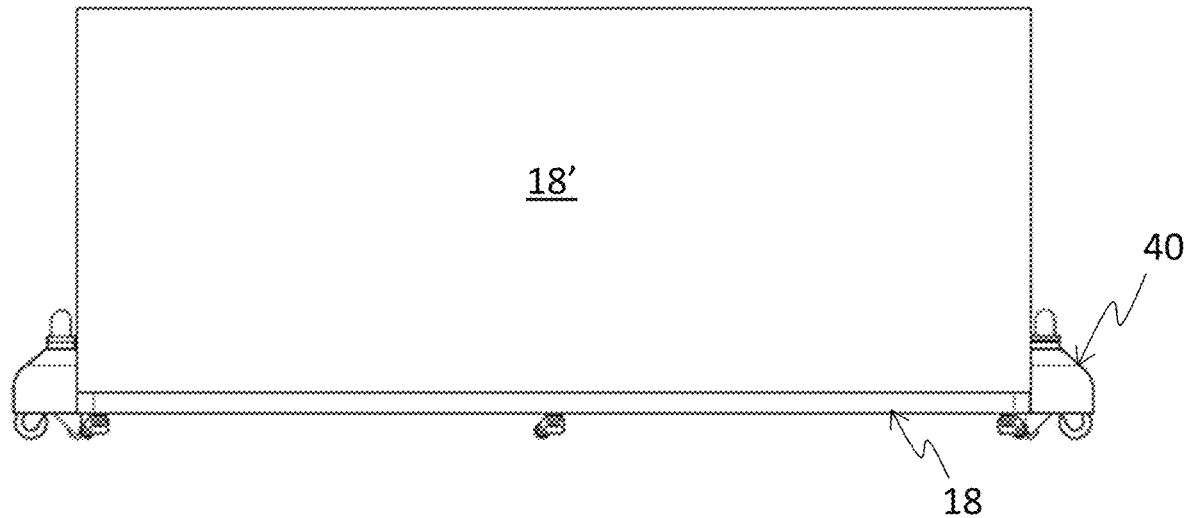
FIG. 3B is a side view and FIG. 3C an alternate side view of a power supply sitting on a frame section according to one embodiment.
Figure 3C:
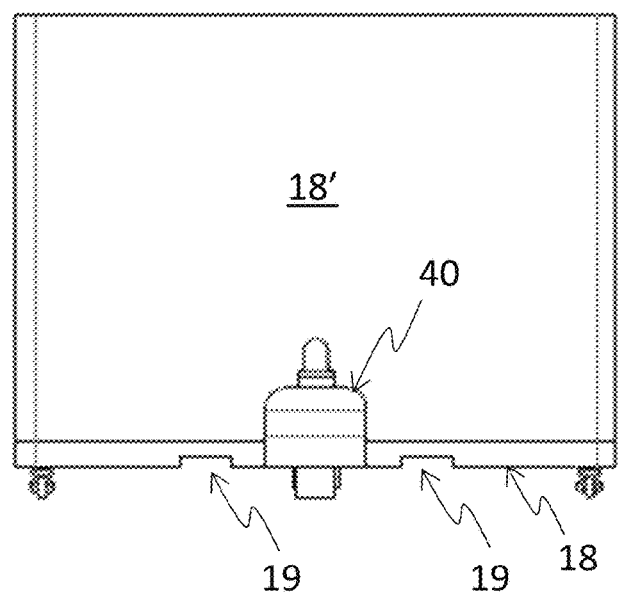

With reference now to FIG. 3, a drive system 40 according to one embodiment includes a motor 44, drive wheel 46 and safety light 42 can connect to individual frame sections using standard connection mechanisms known in the art. The drive system 40 can be remotely operated by an operator 48, such as via remote control or a mobile device app. Since the drive system is detachable, it can be placed strategically about the frame depending on load distribution, direction of movement and other factors. Multiple attachment points can be disposed about the frame perimeter, allowing several points for driving the frame. The drive systems can easily be replaced, or more can be used for transporting heavier frame loads. The drive system can have a rechargeable power source such as a battery, allowing them to easily recharge between uses. The drive system 40 can be used instead of or in conjunction with forklift access channels 19 built into the bottom of each frame.

Figure 4:
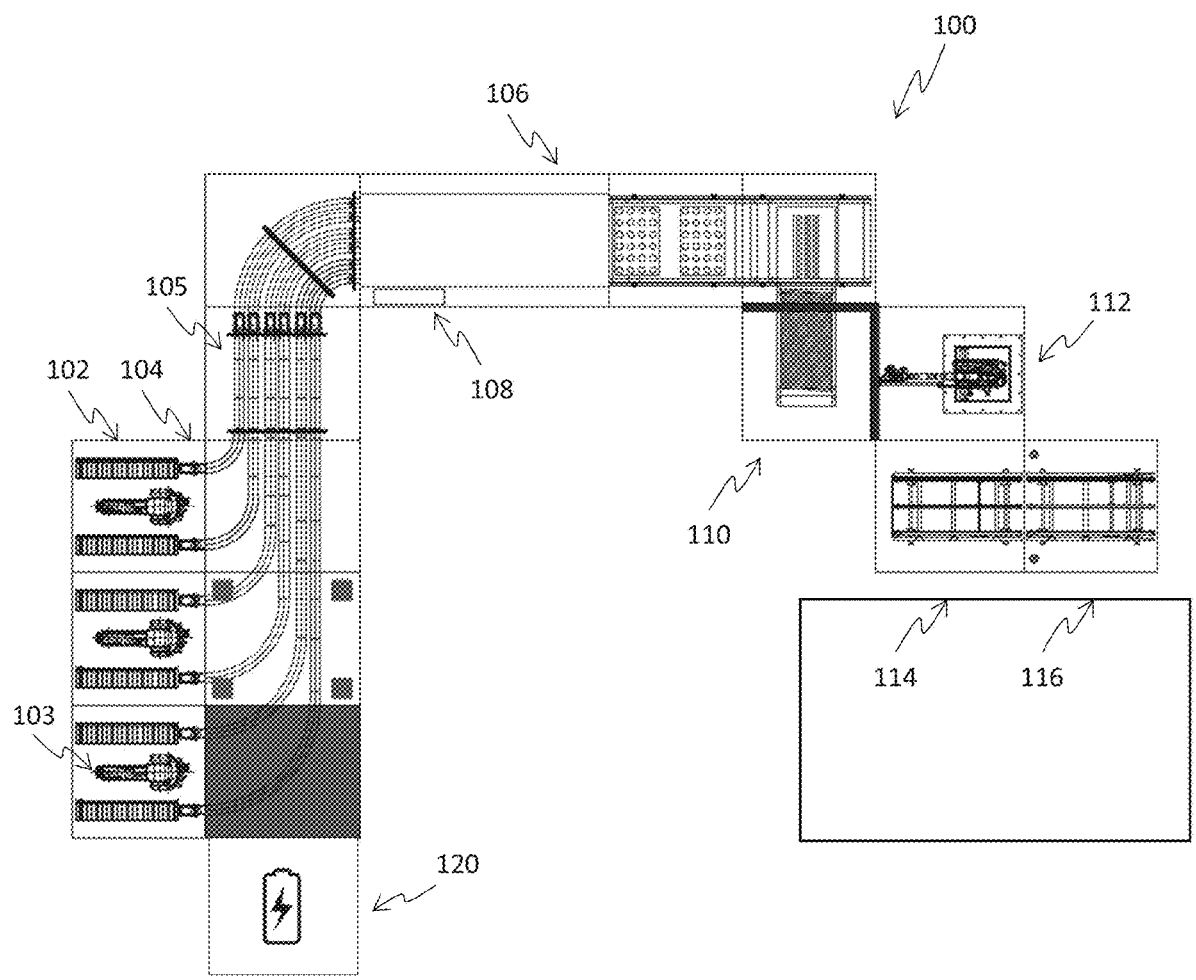
FIG. 4 is diagram of a variety pack production system according to one embodiment.

With reference now to FIG. 4, a system 100 for variety pack production is shown according to one embodiment. Different sections of the system 100 can include one or more pieces of equipment for performing a specific task or subset of tasks for variety pack production. Sections of the system 100 may include for example a case loading section 102 which can have robotic equipment 103 for loading and/or decasing product, a decaser/bottle singulation section 104, powered conveyors 105 for advancing product downstream through the production line, a variety case packer section 106, a variety case former section 108 or feeder for supplying the empty formed packaging, a robotic palletizer section 110 having robotic equipment 112 mounted for palletizing, a pallet loader section 114 and a stretch wrapper section 116 for wrapping completed pallets. Individually packed food or beverage items are introduced into the production line of the system 100 at the case loading section 102, which can include two or more SKU-specific lanes for loading individually wrapped items. Initial product loading can be completed manually by a worker or by robotic loading. The decaser/bottle singulation section 104 aligns product into a single file format as it continues to move through the SKU-specific lane. Based on how many are required in a pack the system selects the product and places it into the variety case in the variety case packer section 106. A variety case former section 108 forms the variety case for use by the variety case packing section 106, where the correct combination of individual items are loaded into each variety case. The completed variety case proceeds to the robotic palletizer section 110 where a robotic arm 112 moves the completed variety case to a pallet. Once the pallet is full or otherwise ready to move it can go directly to a pallet loader section 114 followed by a stretch wrapper section 116 where it is wrapped and ready to move.

Each section of the system 100 has a corresponding frame section which is structured to include one or more leveling, powering, anchoring and transporting features as described in further detail below. Embodiments of the frame structures can include elements for holding electrical and communication lines along with a vibration reduction system for reducing vibrations that may tend to disconnect system components or otherwise damage machinery or the facility frame. The sectional frame structures have a modular design and one or more attachment mechanisms for connecting to an adjacent frame structure, providing easy transport and flexible and arrangement capability. Frame structures can have different sized footprints, and while generally will be square or rectangular can take on other geometries while maintaining modularity.

In one embodiment, a rechargeable battery system 120 is used as a power source to run the system 100. The rechargeable battery system can be partially or fully integrated into or onto a frame section that may include one or more electrical connections for mating with corresponding electrical connections of an adjacent frame section. Some or all frame sections can be equipped with electrical connections that connect to the rechargeable battery system's panel. In one embodiment, multiple connection points are provided so that a recharged battery system can be connected prior-to a depleted battery system being removed, allowing for continuous operation of the system 100 during a battery swap. In one embodiment, frame sections include a battery bay for housing one or more batteries and providing electrical connections to the battery power source.

Figure 5A:
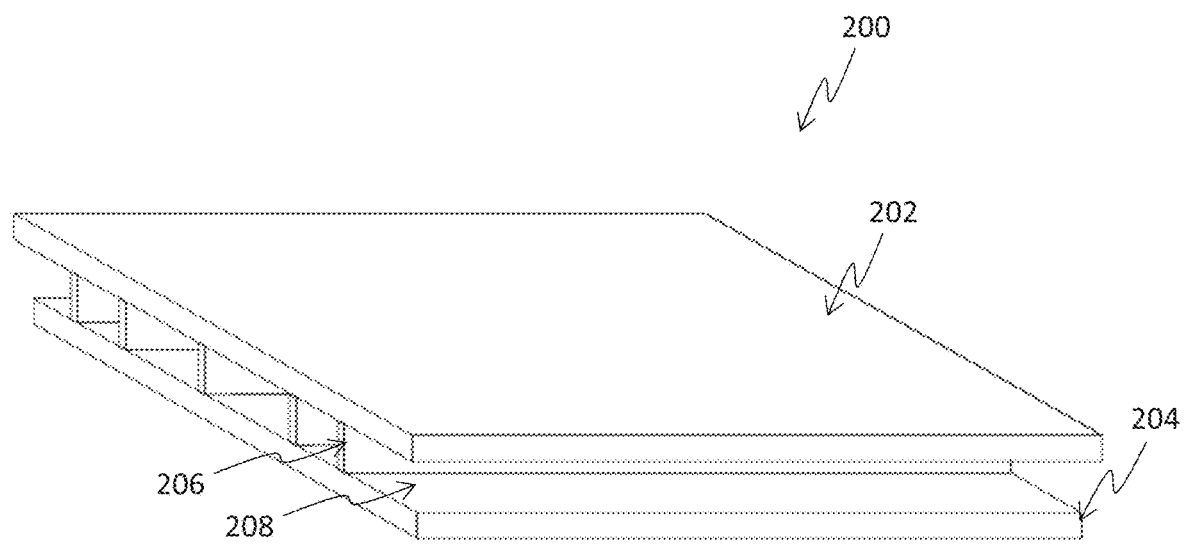
FIG. 5A is a perspective view of a frame section according to one embodiment.
Figure 5B:
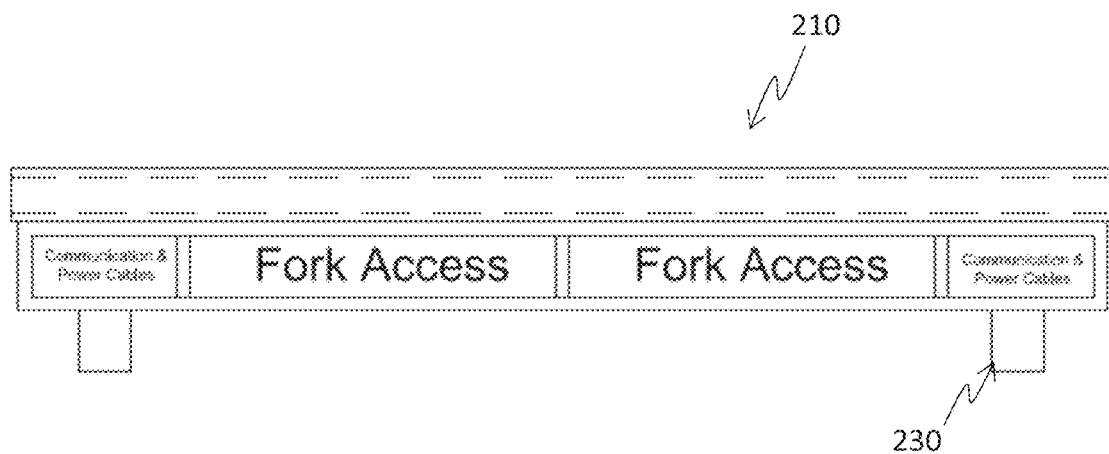
FIG. 5B is a side view of a frame section according to one embodiment.
Figure 5C:
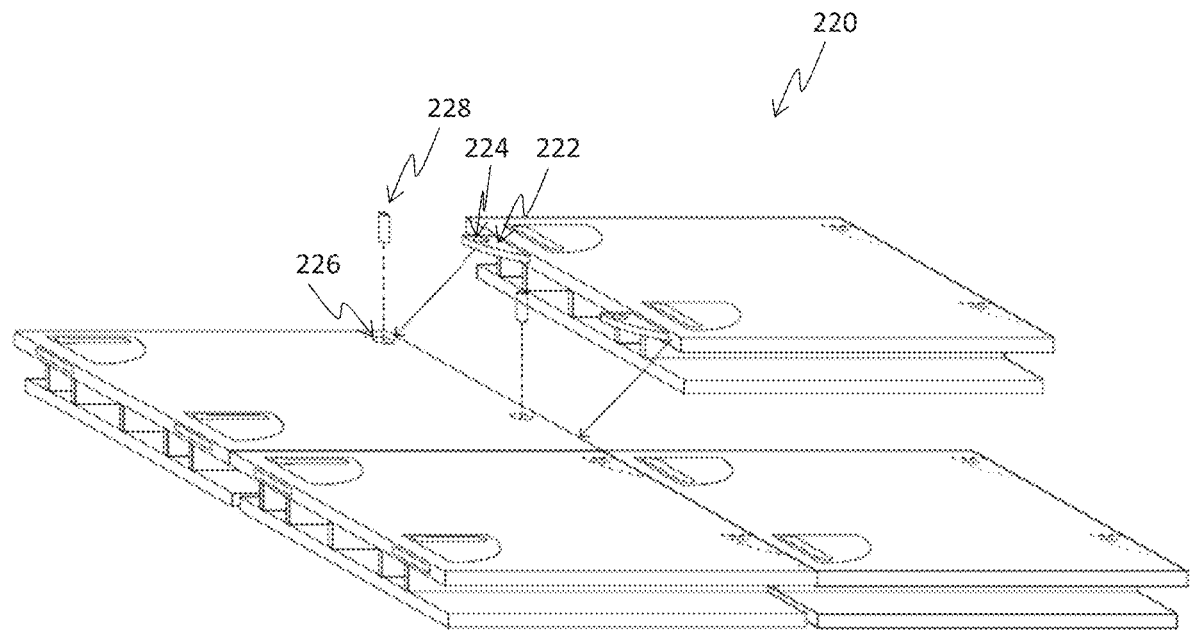
FIG. 5C is a perspective view of connected frame sections according to one embodiment.
Figure 5D:
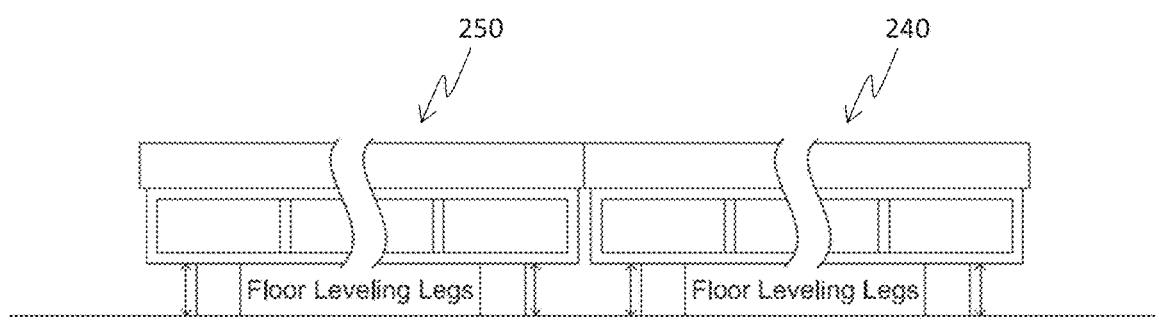
FIG. 5D is a side view of a frame section according to one embodiment.

With reference now to FIGS. 5A-5D, the leveling, powering, anchoring and transporting features will be described in further detail according to several embodiments. As shown in FIGS. 5A and 5B, each frame section (which in one embodiment is an 8'×8' square) has a first layer 202 and second layer 204 separated by spacers 206 that define channels 208 below the top layer 202. One or more channels can be designated for fork access for easy transport, and the modular sizes of each frame piece facilitates stacked storage of frame pieces when not in use. The modular sizes also facilitates alignment of frame section channels. One or more channels can be designated for communications and power lines. The designation and configuration of the channels can change depending on the configuration of the production line, limitations of the facility, preferred access points and various other factors. Several interior layers can be utilized so that fork access and power/communication line access can be in the same footprint. Access between channels (or interior layers) can be provided for example by an opening in the spacer or by openings in the top 202 or bottom 204 layers. In certain embodiments, the spacers terminate before reaching the end of a layer which would also provide access between channels. As shown in FIG. 5C, each frame section 220 can include modular connection elements, such as self-aligning protrusions 222 having an opening 224 that aligns with an opening 226 of an adjacent panel. A pin 228 can be advanced into the openings 224, 226 when aligned for locking adjacent panels into place. The same types of connections can be utilized for connecting drive systems as described in previous embodiments for transporting frame sections. Other types of connection mechanisms known in the art can be utilized. These connection elements can be used for connecting sections during transport or for connecting drive systems to the frame as described in previous embodiments. Connection points (e.g. the anchoring point or a different point of connection) can include a hard-wired connection for connecting power and/or communication lines that are embedded into each frame section. In one embodiment, one or more of the power or communication lines is advanced through a series of channels and/or openings of the frame sections either during connection of frame sections or after frame sections are fully setup. As shown in FIG. 5D, each frame section can include frame leveling legs for keeping the production line and associated equipment level. Frame leveling legs can utilize a leveling mechanism known in the art, for example a threaded leg, a hydraulic stabilizer or a pneumatic system. The frame leveling legs 230 can be part of a leg and caster set as described in previous embodiments.

Figure 6A:
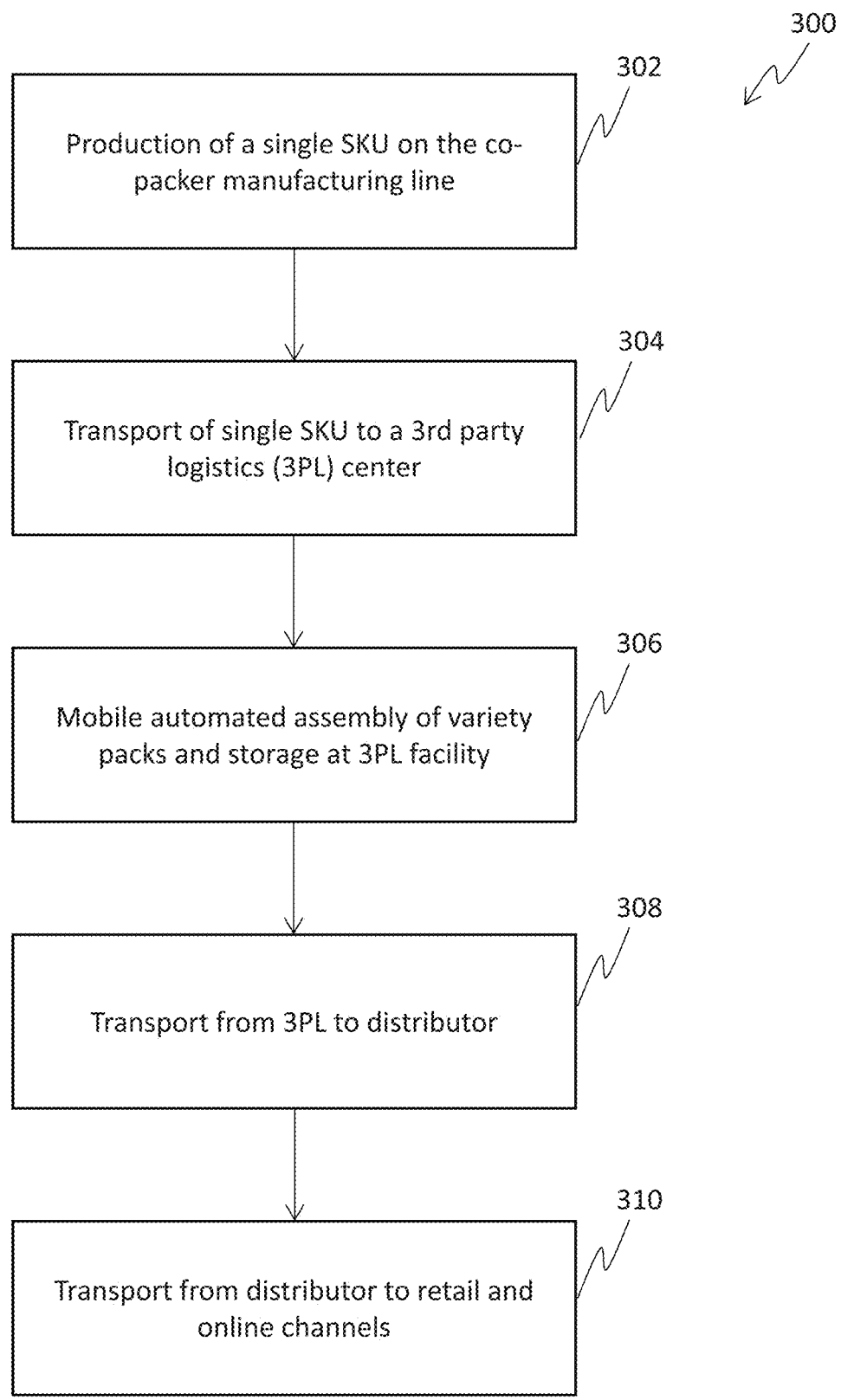
FIG. 6A is a method for variety pack production according to one embodiment.

With reference now to FIG. 6A, a method 300 for variety pack production is described according to one embodiment. First, a single SKU is produced on the co-packer manufacturing line 302. Next, a single SKU is transported to a 3rd party logistics (3PL) center 304. Next, a mobile automated assembly process is implemented to produce the variety packs and they are stored temporarily at the 3PL facility 306. Next, the completed variety packs are transported from the 3PL facility to a distributor 308. Finally, the completed variety packs are transported from the distributor to retail and online channels where they are sold to customers 310.

Figure 6B:
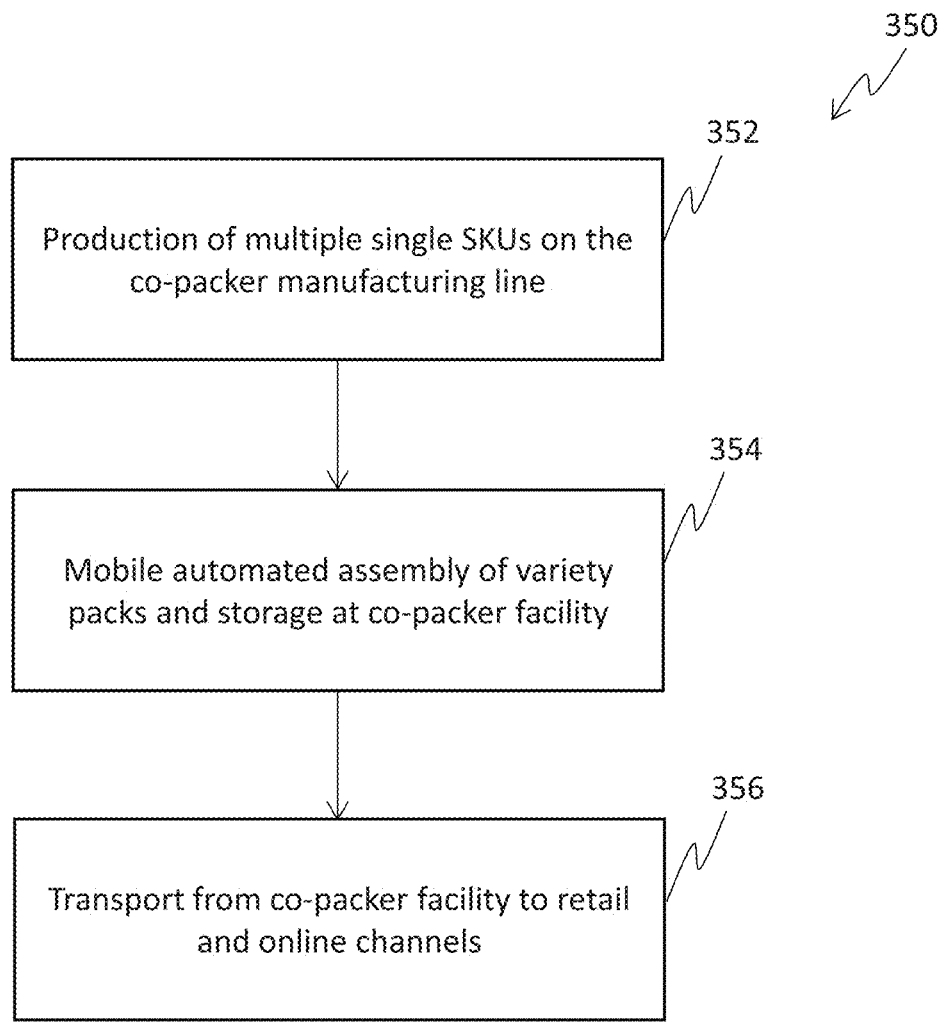
FIG. 6B is a method for variety pack production according to one embodiment.

In another embodiment with reference now to FIG. 6B, a method 350 for variety pack production is further streamlined. First, multiple single SKUs are produced on the co-packer manufacturing line 352. Next, a mobile automated assembly process is implemented to produce the variety packs at the co-packer facility 354. The completed variety packs are transported to retail and online channels 356 where they are sold to customers, or can first be transported to a distributor and from there to retail points of sale.

The mobile automated solution is not only more efficient, not only more scalable, and not only more modular but it also minimizes packaging waste, minimizes emissions from transport, and minimizes costs. Embodiments of the invention employ robotics and automation, bring production closer to the customer and avoid multiple freight charges and touches, and implement a flexible design to allow for short runs and quick-time change overs. Processes that occur throughout the mobile production line include:

Truck to Floor: onloading the pallets

Pallet to Line: unloading the trays and cases

Line to Lane: arranging the product in SKU-specific lanes for variety packing

Lane to Package: creating the variety pack—either with tray and shrink or box

Package to Pallet: building the pallet

Embodiments of the system include several unique design elements to enable the automated mobile and modular variety and multi packing production line:

Leveling: a mobile frame leveling system that will secure the packaging line to a separate platform that can be placed on uneven frames;

Powering: electrical quick disconnects that will allow the system to quickly move into a different configuration or from one location to another as long as each location has these quick disconnects;

Anchoring: a dynamic load suppression system—reducing shaking and vibrations in the production line equipment that prevents the production line from coming apart since embodiments of the system are not secured to a concrete frame using a traditional bolt system; and Transporting: compact designs that have all of the power, controls and equipment on one machine frame so they can be moved together. A customized cooling options for controls can be implemented.

What is claimed is:

1. A product packing system comprising:
   a plurality of product packing production sections comprising:
   a product loading section comprising at least one loading lane configured to receive units of a product;
   a conveyor section comprising at least one conveyor lane and configured to convey, away from the product loading section via the at least one conveyor lane, the received units of the product; and
   a product packer section configured to receive, from the conveyor section, the conveyed units of the product, select a quantity of the units of the product, and place the selected units of the product into a product pack; and
   a plurality of modular frame sections, each modular frame section supporting one of the plurality of product packing production sections and configured to connect to at least one adjacent modular frame section of the plurality of modular frame sections.

2. The product packing system of claim 1, wherein the product loading section is configured to receive a case comprising the units of the product.

3. The product packing system of claim 1, wherein at least one modular frame section, of the plurality of modular frame sections, comprises one or more electrical connectors and is configured to electrically connect to at least one adjacent modular frame section of the plurality of modular frame sections.

4. The product packing system of claim 1, wherein at least one modular frame section, of the plurality of modular frame sections, comprises one or more communication connectors and is configured to communicatively connect to at least one adjacent modular frame section of the plurality of modular frame sections.

5. The product packing system of claim 1, wherein at least one modular frame section, of the plurality of modular frame sections, comprises one or more compressed air connectors and is configured to fluidly connect to at least one adjacent modular frame section of the plurality of modular frame sections.

6. The product packing system of claim 1, wherein at least one modular frame section, of the plurality of modular frame sections, comprises one or more mechanical connectors and is configured to mechanically connect to at least one adjacent modular frame section of the plurality of modular frame sections.

7. The product packing system of claim 1, wherein at least one modular frame section, of the plurality of modular frame sections, comprises:
   at least one communication line configured to connect to at least one corresponding communication line of an adjacent modular frame section of the plurality of modular frame sections; and
   at least one power line configured to connect to at least one corresponding power line of the an adjacent modular frame section.

8. The product packing system of claim 7, wherein the power line is an electrical power line.

9. The product packing system of claim 7, wherein the power line is a compressed air power line.

10. The product packing system of claim 1, further comprising a singulation section configured to arrange the received units of the product in a single-file arrangement, wherein the conveyor section is configured to convey the received units of the product away from the product loading section in the single-file arrangement.

11. The product packing system of claim 1, wherein:
    the received units of the product comprise different types of product units; and
    the at least one conveyor lane comprises a plurality of adjacent conveyor lanes, each adjacent conveyor lane being configured to convey, away from the product loading section, one of the different types of product units.

12. The product packing system of claim 1, wherein each modular frame section, of the plurality of modular frame sections, comprises:
    a plurality of transport mechanisms; and
    a plurality of leveling mechanisms;
    wherein the plurality of leveling mechanisms are configured to transition between a first position and a second position; and
    wherein the plurality of transport mechanisms are configured to engage a floor based on the plurality of leveling mechanism transitioning to the first position and configured to disengage the floor based on the plurality of leveling mechanisms transitioning to the second position.

13. The product packing system of claim 1, further comprising a consolidated electrical panel configured to provide, via single-point electrical connection, electric power to each modular frame section of the plurality of modular frame sections, wherein each modular frame section further comprises one or more electrical connections configured to mate with one or more corresponding electrical connections of an adjacent modular frame section.

14. A method of providing a product packing system comprising:
    assembling a plurality of modular frame sections into an assembled product packing system, each modular frame section being configured to connect to at least one adjacent modular frame section of the plurality of modular frame sections, and each modular frame section supporting one of a plurality of product packing production sections, wherein the plurality of product packing production sections comprises:
    a product loading section comprising at least one loading lane configured to receive units of a product;
    a conveyor section comprising at least one conveyor lane and configured to convey, away from the product loading section via the at least one conveyor lane, the received units of the product; and
    a product packer section configured to receive, from the conveyor section, the conveyed units of the product, select a quantity of the units of the product, and place the selected units of the product into a product pack;
    loading the assembled product packing system on a transport;
    transporting the assembled product packing system toward an installation location using the transport;
    unloading the assembled product packing system from the transport; and
    moving the assembled product packing system to an installation site at the installation location.

15. The method of claim 14, wherein moving the assembled product packing system to the installation site comprises rolling the assembled product packing system to the installation site.

16. The method of claim 14, wherein:
each modular frame section comprises casters; and
rolling the assembled product packing system to the installation site comprises rolling the assembled product packing system to the installation site using the casters.

17. The method of claim 14, wherein:
each modular frame section comprises, on one or more sides of the modular frame section, at least one attachment point configured to attach to a drive system; and
moving the assembled product packing system to the installation site comprises attaching the drive system to at least one modular frame section and driving the assembled product packing system to the installation site using the drive system.

18. The method of claim 17, wherein the drive system is controllable via a remote control unit.

19. The method of claim 18, wherein the remote control unit comprises a mobile application in signal communication with the drive system.

20. The method of claim 14, further comprising swapping a first modular frame section of the assembled product packing system with a second modular frame section after moving the assembled product packing system to the installation site.

21. The method of claim 14, wherein loading the assembled product packing system on a transport comprises loading the assembled product packing system into a transport having a length of no more than about 53 feet and a width of no more than about 8 feet.

22. The method of claim 14, wherein each modular frame section has a length of about 8 feet and a width of about 8 feet.

23. The method of claim 14, wherein each modular frame section comprises a leveling system comprising:
plurality of casters; and
a plurality of leveling legs, wherein each of the plurality of leveling legs comprises:
an adjustable leveling foot that extends downward from the leveling leg; and
one of the plurality of casters, wherein the caster extends downward from the leveling leg and is positioned adjacent to the adjustable leveling foot;
wherein the adjustable leveling foot is configured to:
transition between a raised and lowered position;
cause the caster to disengage a floor based on the leveling foot transitioning from the raised position to the lowered position;
cause the caster to engage the floor based on the leveling foot transitioning from the lowered position to the raised position; and
modify a leveling of the modular frame section based on an adjustment made to the leveling foot while the caster is disengaged from the floor.

24. The method of claim 14, further comprising leveling at least one modular frame section after moving the assembled product packing system to the installation site using a leveling system of the modular frame section.

* * * * *